(12) United States Patent
Kochanov et al.

(10) Patent No.: US 12,506,833 B2
(45) Date of Patent: Dec. 23, 2025

(54) SYSTEM AND METHOD FOR INTERRUPTING AN INCOMING UNWANTED CALL ON A MOBILE DEVICE

(71) Applicant: AO Kaspersky Lab, Moscow (RU)

(72) Inventors: Sergey A. Kochanov, Moscow (RU); Alexey P. Komissarov, Moscow (RU); Victor V. Yablokov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 436 days.

(21) Appl. No.: 17/990,106

(22) Filed: Nov. 18, 2022

(65) Prior Publication Data

US 2023/0254405 A1 Aug. 10, 2023

(30) Foreign Application Priority Data

Feb. 10, 2022 (RU) .................................. 2022103408

(51) Int. Cl.
*H04M 3/436* (2006.01)
(52) U.S. Cl.
CPC .... *H04M 3/436* (2013.01); *H04M 2203/6072* (2013.01)
(58) Field of Classification Search
CPC ............. H04M 3/436; H04M 3/42102; H04M 2203/6072
See application file for complete search history.

(56) References Cited

U.S. PATENT DOCUMENTS

| | | | |
|---|---|---|---|
| 9,060,057 B1* | 6/2015 | Danis | H04L 63/083 |
| 10,951,756 B1* | 3/2021 | Silverstein | H04M 3/436 |
| 2008/0292085 A1* | 11/2008 | Pappas | G06Q 50/60 |
| | | | 705/26.1 |
| 2015/0304494 A1* | 10/2015 | Corfield | H04W 4/24 |
| | | | 455/406 |
| 2020/0304546 A1* | 9/2020 | Chavez | H04L 65/1076 |

* cited by examiner

*Primary Examiner* — Farid Seyedvosoghi
(74) *Attorney, Agent, or Firm* — ArentFox Schiff LLP; Michael Fainberg

(57) ABSTRACT

A method of interrupting an incoming call on a mobile device includes: intercepting an incoming telephone call received by a mobile device; determining one or more parameters of the intercepted telephone call; determining if the intercepted telephone call matches one or more telephone calls associated with a list of prohibited phone numbers by comparing the determined parameters of the intercepted call with parameters of the one or more telephone calls associated with the list of prohibited phone numbers; and in response to determining a match between the intercepted telephone call and the one or more telephone calls associated with the list of prohibited phone numbers: blocking reception of the intercepted telephone call; identifying a calling party associated with the intercepted telephone call; sending an authentication request to the identified calling party; and interrupting the intercepted telephone call in response to unsuccessful authentication.

18 Claims, 3 Drawing Sheets

SYSTEM AND METHOD FOR INTERRUPTING AN INCOMING UNWANTED CALL ON A MOBILE DEVICE

CROSS-REFERENCE TO RELATED APPLICATION

This application claims benefit of priority under 35 U.S.C. 119(a)-(d) to a Russian Application No. 2022103408 filed on Feb. 10, 2022, which is incorporated by reference herein.

FIELD OF TECHNOLOGY

The present disclosure relates generally to information security, and, in particular to methods and systems for interrupting an incoming unwanted call on a mobile device.

BACKGROUND

The continued evolution of wireless network technology allows consumers today to communicate with each other by voice through highly sophisticated mobile devices (phones, smartphones, and tablets capable of receiving phone calls). In addition, as the path of evolution progresses, mobile devices increasingly are used as means of active interaction with users (e.g., to provide feedback to the user, receive information about the user or his/her interests, and so on). As a result, users typically receive much more calls (including the calls containing advertising, surveys, and fraudulent calls).

Thus, It has become commonplace for individual devices, particularly mobile devices, to receive information without user's permission, and in many cases such information is either not needed by the user (for example, almost all non-personalized advertising or surveys) or maybe even dangerous (for example, fraudulent calls). As a result, users (e.g., users of mobile devices) often limit the amount of information they obtain, which may include, among other things, useful information. Alternatively, mobile devices may try to analyze all incoming information, which leads not only to loss of time, waste of resources, increased general discomfort from owning mobile devices, but also to the risk of being exposed to malicious effects, which can lead to financial or reputational losses.

To address the aforementioned problems, various technologies and methods may be employed that may limit unwanted calls (such as, calls having information about which person would prefer to avoid the calls) or may limit the duration of unwanted calls. Conventional tools and techniques for deterring unsolicited (unwanted) calls may involve limiting calls from phone numbers that are pre-added to a list of blocked phone numbers. The disadvantage of this method is that, using call forwarding technology and other similar technologies, it may be possible to make calls from one phone number so that the caller ID authentication system of a subscriber identifies such calls as calls coming from another legal number (for example, from a bank number). Another commonly used method of blocking unwanted calls may enable a calling party to restrict calls from all numbers except favorite phone numbers that may be pre-added to a list of allowed phone numbers. The disadvantage of this method is that decisions to allow or block a call to called parties are accomplished by using a limited list of phone numbers, which may lead to important calls from a number that is not included in the list of allowed numbers to be blocked.

Some conventional caller authentication technologies may transmit the caller's phone number to the authentication service, which may be configured to determine whether the specified number is genuine or fake.

Such conventional caller authentication technology typically works well with the tasks of recognizing telephone numbers, but may not work as well if there is phone number spoofing, such as a situation where an unwanted phone number is misrepresented as an expected one.

Thus, there is a need for efficient interruption of incoming unauthorized calls to users' mobile devices.

SUMMARY

In an aspect, the disclosed method of interrupting an incoming call on a mobile device includes:

Intercepting an incoming telephone call received by a mobile device; determining one or more parameters of the intercepted telephone call; determining if the intercepted telephone call matches one or more telephone calls associated with a list of prohibited phone numbers by comparing the determined parameters of the intercepted call with parameters of the one or more telephone calls associated with the list of prohibited phone numbers; and in response to determining a match between the intercepted telephone call and the one or more telephone calls associated with the list of prohibited phone numbers: blocking reception of the intercepted telephone call; identifying a calling party associated with the intercepted telephone call; sending an authentication request to the identified calling party; and interrupting the intercepted telephone call in response to unsuccessful authentication.

In an aspect, the disclosed method, the one or more parameters of the intercepted call are determined based on data transmitted by a mobile operator to the called party for making a connection between the calling party and the called party.

In an aspect, the one or more parameters of the intercepted call are one or more of: a telephone number of the calling party; a name of the calling party; a location of the calling party; time of interception of the incoming telephone call.

In an aspect, blocking the reception of the intercepted telephone call is performed based on a list of prohibited telephone numbers.

In an aspect, the authentication request includes at least the following information: called party; calling party; one or more parameters of the intercepted call.

In an aspect, the authentication is successful if the calling party acknowledges that the information received in the authentication request matches information stored the call data stored by the calling party.

In an aspect, in response to successful authentication, unblocking reception of the intercepted telephone call.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for interrupting an incoming unwanted call on a mobile device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
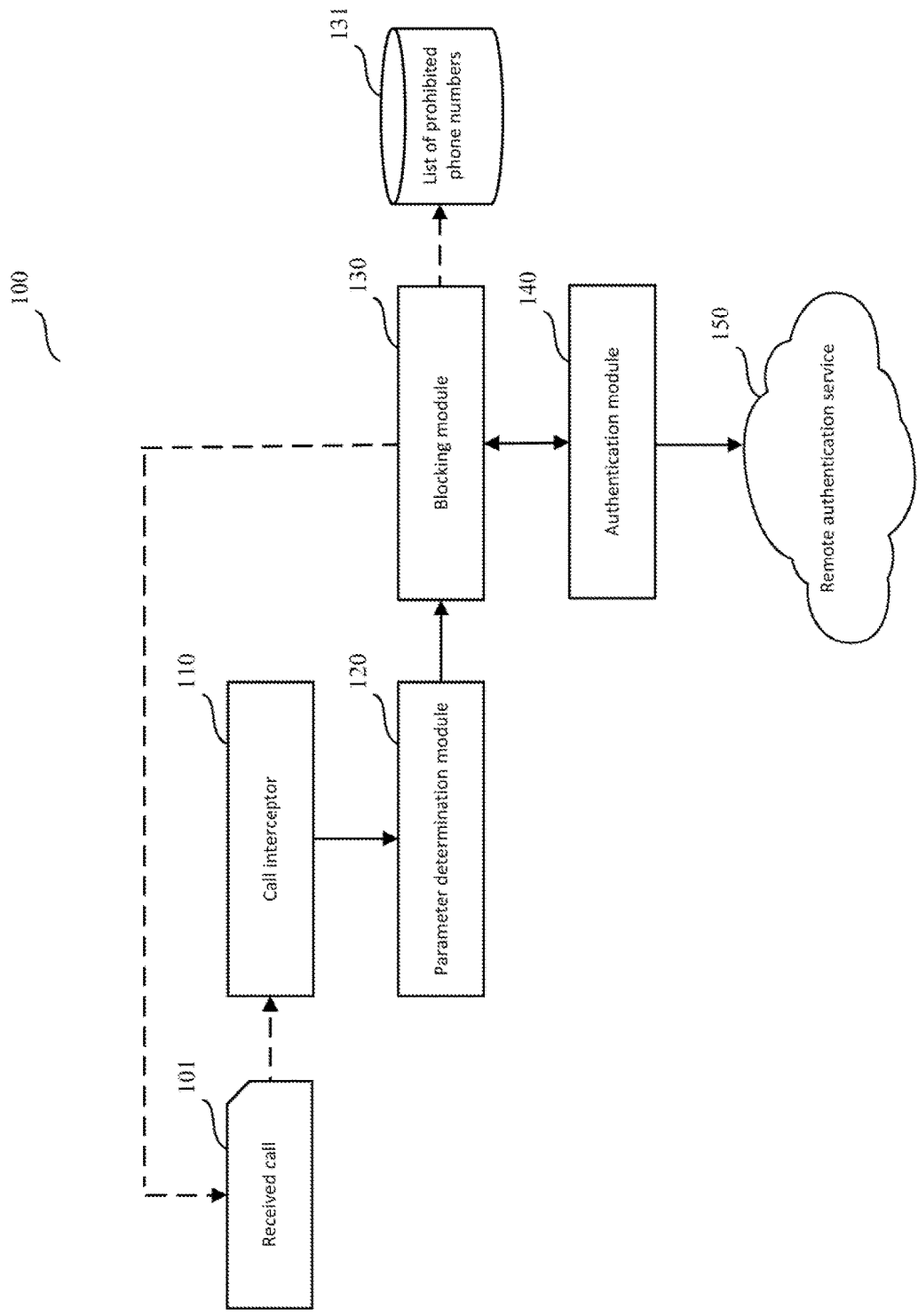
FIG. 1 shows schematically a particular example of an interrupt system for an incoming subscriber call on a mobile device.

FIG. 1 shows schematically a particular example of an interrupt system 100 for an incoming subscriber call on a mobile device.

In an aspect, the interrupt system may include a received call 101, a call interceptor 110, a parameter determination module 120, a blocking module 130, an authentication module 140, and a remote authentication service 150. In an aspect, the modules described below may be implemented as elements of a computer system or a set of computer systems described in more detail in FIG. 3. In particular, the hardware processor of the computer system may include a call interceptor 110, a parameter determination module 120, a blocking module 130 and an authentication module 140. In addition, the hardware processor may be configured to carry out the functionality of said modules. The remote authentication service 150 (in particular the server) may be implemented using a remote server located on the network, with which communication may be carried out via computer communication lines.

The received call 101 may be a telephone call from a caller to the subscriber who is a user of the mobile device described below.

In an aspect, the call interceptor 110 may be configured to intercept the received call 101 on the mobile device.

In addition, the call interceptor 110 may be configured to determine whether a caller has made a call to a subscriber of a mobile device.

The call interceptor 110 may include, but is not limited to:
an integrated module for receiving calls on a mobile device, which may be configured to transmit received calls or information about the received calls (for example, by providing corresponding Application Programming Interface (API) to the operating system of the mobile device);
a component of an antivirus application or the application itself installed on a mobile device, with permission to provide access to received phone calls (for example, such component may be implemented in the Android operating system).

The parameter determination module 120 may be configured to determine the parameters of the received call 101 intercepted by the call interceptor 110.

In an aspect, the parameters of the intercepted call may be determined based on the data transmitted by the mobile operator to the called party to make the call between the caller and the called party (in that user's mobile device). In other words, the analysis of the received call from the point of view of the called party may begin with the receipt by the parameter determination module 120 of the data defining the received call 101.

In an aspect, the parameters determination module 120 may extract parameters from the data transmitted by the mobile operator to the called party in accordance with a certain structure of such data or the parameters may be calculated based on the transmitted data.

In yet another aspect, parameters of the intercepted (received) call 101 may include but are not limited to: the caller's phone number; the name of the calling party; the location of the calling party; the time it took to intercept the received call.

In an aspect, the call blocking module 130 may be configured to: block the reception by the user of the call 101 intercepted by the call interceptor 110, in response to the parameter determination module 120 determining that parameters of the intercepted call 101 correspond to the protected call, that is, a call that is accepted only if it is made by the authorized caller; interrupt the call 101 blocked by the call interceptor 110.

It should be noted that for purposes of the present disclosure there is a difference between blocked and interrupted calls. As used herein, the term "blocked call" refers to a call received by a mobile device, but not communicated to the user of the mobile device (i.e. not received by the user). For example, the user of the corresponding mobile device may not be notified of the receipt of the blocked call through visualization (display on the screen of the mobile device), vibration of the mobile device, audible indication or in any other way. As used herein, the term "interrupted call" refers to a call received by a mobile device, but then terminated in any manner known in the art, for example, through acceptance by the user and subsequent automatic termination, automatic termination after a predetermined period of time by the mobile operator, and the like.

In an aspect, blocking the reception of an intercepted call by the blocking module 130 may include but is not limited to:
a. prohibiting other applications on the mobile device, including services of the operating system of the specified mobile device, from receiving the intercepted call 101, that is, receiving information transmitted by the caller initiating the intercepted call 101 to the user of the mobile device;
b. prohibiting informing the user about the intercepted call 101, including but not limited to, displaying information about the intercepted call, audible warning, vibration, and the like.

In an aspect, the blocking module 130 may be configured to block the reception of the intercepted call 101 based on a list of prohibited numbers 131, if the list of prohibited numbers 131 contains the phone number associated with the intercepted call 101.

In an aspect, the list of prohibited numbers 131 may comprise a standard "black list of phone numbers" that may be used by various modules of the specified mobile device.

Thus, the "black list of phone numbers" on the mobile device may be pre-populated with specified phone numbers. In an aspect, no call from the specified phone number (or from a phone number disguised as a specified phone number) may be accepted by the specified mobile device.

For example, in response to intercepting the received call 101, the caller's telephone number may be temporarily added to the list of prohibited numbers 131. After the caller associated with the received call 101 is authenticated (as described below) and if the received call 101 is subsequently interrupted or if the reception of the intercepted call by the subscriber is unblocked, the telephone number associated with the received call 101 may be removed from the list of prohibited numbers 131 by the blocking module 130. In an aspect, the list of prohibited numbers 131 may be stored in a database.

In another example, the telephone number of the caller (for example, a bank) may be preliminarily placed by the caller in the list of prohibited numbers 131 (for example, the bank may use an online banking application to place the numbers of its employees or services in the list of prohibited numbers 131 in order to prevent calls from fraudsters with the substitution of telephone numbers).

In another aspect, the blocking module 130 may be configured to block the reception of an intercepted call 101 by receiving an intercepted call 101 and holding the call in a "pending" state until a decision is made using the authentication module 140 to interrupt or unlock the intercepted call 101.

In yet another aspect, the call blocking module 130 may be further configured to unlock the user's acceptance of the intercepted call 101 in the event of successful authentication performed by the authentication module 140.

In an aspect, the authentication module 140 may be configured to: identify the caller (calling party) of the received call 101 intercepted by the call interceptor 110 based on the call parameters determined by the parameter determination module 120; request data from the identified caller to authenticate the caller associated with the received call 101 intercepted by the call interceptor 110; authenticate the received call 101 intercepted by the call interceptor 110 based on the received requested data.

In an aspect, the identification of the caller of the intercepted call 101 is understood as an unambiguous identification of the caller by the authentication module 140. In other words, a call with a spoofed number and a direct call with such a number will be identified as different calls by the authentication module 140.

In an aspect, the authentication module 140 may determine the caller of the intercepted call 101 by searching for caller information in a caller identifier database containing pre-entered caller information associated with the telephone number of the intercepted call 101.

In yet another aspect, the remote authentication service 150 may be configured to act as a particular caller.

The remote authentication service 150 may be configured to register information about the subscriber's call transmitted by the calling party, and then exchange information with the subscriber to confirm the subscriber's call.

In an aspect, the request for authentication of the intercepted call 101 may include but is not limited to the following information: the called party; the calling party; parameters of the intercepted call 101, in particular, the time of interception of the intercepted call 101.

In an aspect, authentication may include determining from the parameters determined from the intercepted call 101 the data transmitted by the caller to the remote authentication service 150.

In an aspect, authentication may be considered successful by the remote authentication service 150, if the caller acknowledges that the call data received in the request corresponds to the call data stored by the caller.

For illustrative purposes only, an example of the operation of the system described above for interrupting an incoming call of a subscriber on a mobile device is presented below.

A bank may organize a customer call service using call authorization provided by the remote authentication service 150 to increase the security of telephone calls between its employees (for example, a call center) and customers, including, but not limited to protecting customers from fraudsters posing as bank specialists. In an aspect, the remote authentication service 150 may be configured to perform the following tasks:

before the bank employee makes a call to the client (user's mobile device), the remote authentication service 150 may be notified of the intended call by automatically transmitting additional information characterizing the call 101 to the remote authentication service 150. Such additional information may include, but is not limited to the time of the call, the expected duration of the call, the identifier of the called party, and so on;

at the request of the user, on whose mobile device the described system of interruption of the incoming call of the subscriber operates, information may be provided on whether the registered call from the bank is actually made to the client. Such a conclusion may be made by the remote authentication service 150, for example, based on the information provided in the request about the telephone number of the caller;

if no call from the bank to the client is made (in other words, the call is made by a party that is not a bank, but pretending to be a bank), upon request from the client, the remote authentication service 150 may provide information that the call is not made;

after the completion of the telephone conversation between the bank employee and the client, the information about the corresponding call may be either marked as irrelevant or deleted by the remote authentication service 150. Accordingly, during the next call, the client will be given information that no calls are received from the bank's employees to the client.

After making a call to the client, the described system 100 may employ a call interceptor 110 to intercept a call 101 from a bank employee to the client. In this case, the interception is performed by the call interceptor 110 before the client (user of the mobile device) is notified of the call. In other words, the interception may be performed before the audible, visual, tactile or other, now known or later developed, notification about the intercepted call 101.

In an aspect, after the received call 101 has been intercepted, the caller's telephone number may be determined using the parameter determination module 120. The parameter determination module 120 may determine the caller to whom the determined number belongs to based on the determined phone number. In addition, the parameter determination module 120 may determine the corresponding bank based on corresponding remote authentication service 150. For example, different banks may have their own independent remote authentication services 150.

In an aspect, after the call 101 has been intercepted by the call interceptor 110, the call blocking module 130 may hold the call, by disabling notifications to the user of the mobile device that the call is being made. In an aspect, the call blocking module 130 may perform the call blocking, for example, by using a list of forbidden numbers, which may include the phone number of the caller that may be previously determined by the parameter determination module 120.

In some cases, a more reliable protection option may be possible. For example, the bank may pre-transmit to the user's mobile device (for example, by using automatic modules of online banking) the list of prohibited numbers 131 that may contain all the phone numbers of the bank from which calls to the client may be initiated. Thus, the disclosed system 100 may prevent any opportunity to make unauthorized dialing to the user from the specified numbers or by replacing with the specified phone numbers.

After the call 101 is blocked, a remote authentication service 150 may be determined based on the determined phone number. The remote authentication service 150 may be determined in various ways. For example, the network address of the remote authentication service 150 may be obtained from the network (if the bank somehow supports this type of functionality), and/or may be determined locally (for example, if the phone number on the mobile device is set to match the network address) or by any other known method or later developed. After determining the network address of the remote authentication service 150, a request may be sent to the remote authentication service 150 containing information about the caller's number. In an aspect, in response to receiving the request, the remote authentication service 150 may compare the received information with the existing one and may conclude that the call to the user's mobile device is made from the bank.

In an aspect, in response to successful authentication, the call blocking module 130 may release the call 101, after which the user can start a telephone conversation with the caller.

Next example illustrates a situation where a call is made by a fraudster who has replaced their actual phone number with a bank number using some technical means. In this case, the user of the mobile device will similarly think that a call is made from the bank.

After receiving the call 101, the interrupt system 100 may perform the same actions as in the example above. But unlike the first example, where a call to a user of a mobile device was made by an actual bank employee, in this case the remote authentication service 150 will have no information about the call 100. If there were previous bank calls to the same user, they will either be deleted from the remote authentication service 150, or marked as irrelevant.

After determining the network address of the remote authentication service 150, a request may be sent to the remote authentication service 150 containing information about the phone number of the caller. In an aspect, in response to receiving the request, the remote authentication service 150 may compare the received information with the existing one, but since the fraudster does not have access to the remote authentication service 150 and cannot register their calls with the remote authentication service 150, then a generated response to the request in this case may indicate unsuccessful authentication.

In other words, the aforementioned examples illustrate two radically different situations:
1) in the first case the call 101 is legitimate, therefore it is registered with the remote authentication service 150, and therefore can eventually reach the user of the mobile device;
2) in the second case the call 101 is illegitimate, therefore it is not registered with the remote authentication service 150, even if the call is "disguised" as legitimate, and therefore will be interrupted and prevented by the call blocking module 130 from reaching the user of the mobile device.

Based on the information about the unsuccessful authentication, the call blocking module 130 may interrupt the call 101.

In an aspect, the user of the mobile device may be notified about an unauthorized call attempt.

Figure 2:
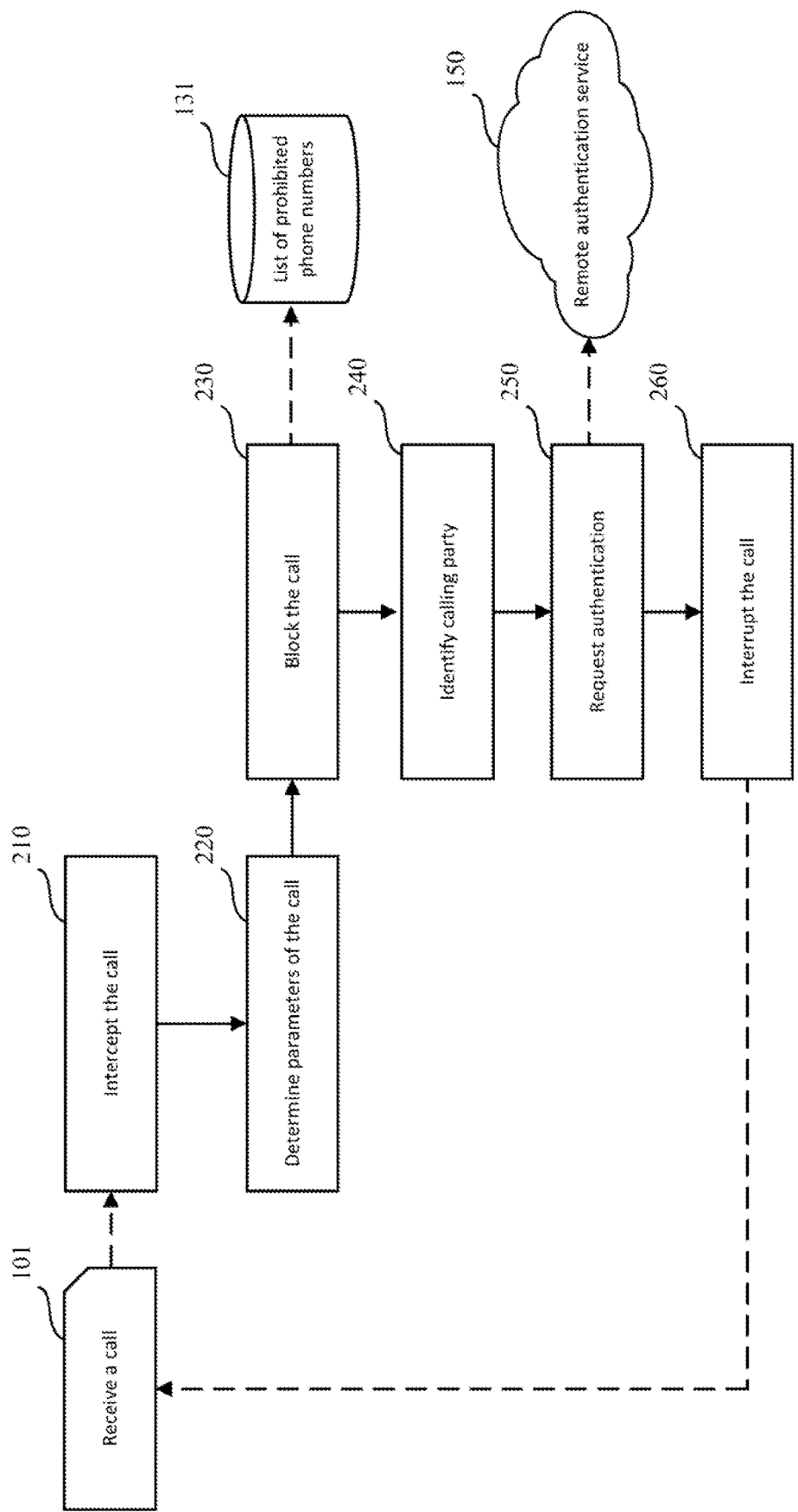
FIG. 2 is a flow chart illustrating a method for interrupting an incoming call on a mobile device.

FIG. 2 is a flow chart illustrating a method for interrupting an incoming call on a mobile device.

The flow chart of the method of interrupting the incoming call of the subscriber on the mobile device includes a step 210 in which the call may be intercepted, a step 220 in which the parameters of the call may be determined, a step 230 at which the call may be blocked, a step 240 at which the calling party may be identified, a step 250 at which authentication may be requested, and a step 260 at which the call may be interrupted.

A method of interrupting an incoming call on a mobile device may be performed using the modules of an incoming call interrupt system 100 on a mobile device that may include a processor and memory and that is described in greater detail above in conjunction with FIG. 1.

In an aspect, at block 210, the call interceptor 110 may intercept the received call 101 on the mobile device.

At block 220, the parameter determination module 120 may determine the parameters of the call 101 intercepted at block 210.

In an aspect, the parameters of the intercepted call 101 may include but are not limited to: the calling party's phone number; the name of the calling party; the location of the calling party; the time it took to intercept the call.

Steps 230-260 may be performed if it is possible to successfully determine the connection between the intercepted call and the list of prohibited numbers 131 by comparing the parameters of the intercepted call with the parameters of the call associated with the list of prohibited numbers 131.

In an aspect, the connection between the intercepted call and the list of prohibited numbers 131 may be found if the parameters determined in step 220 correspond to the protected call (a call that is accepted only if it is made by an authorized caller).

For this purpose, the intercepted call may be compared with a call associated with the list of prohibited numbers 131 for which the parameters of the call associated with the list of prohibited numbers 131 are compared with the parameters of the intercepted call.

In an aspect, when comparing the parameters of the intercepted call with the parameters of the call associated with the list of prohibited numbers 131, the parameter determination module 120 may determine the degree of similarity between the compared calls. In an aspect, the parameter determination module 120 may determine the degree of similarity using any of the known methods, by determining the similarity of textual information or the similarity of corresponding hash values, for example, using heuristics, such as, but not limited to, Damerau-Levenshtein distance, Levenshtein distance, Hamming distance, Jaro-Winkler similarity, and the like. In an aspect, the degree of similarity may have a numerical value ranging from 0 to 1, where 0 indicates that the compared calls are completely different, and 1 indicates that the compared calls are identical. In an aspect, if the degree of similarity exceeds a predefined threshold value, the corresponding calls may be recognized by the parameter determination module 120 as similar, between which a link may be established.

At block 230, the blocking module 130 may block the call 101 intercepted at block 210.

In an aspect, the blocking module 130 may block the reception of the intercepted call 101 based on a pre-generated list of prohibited numbers 131, if such list contains the number associated with the intercepted call 101.

At block 240, the authentication module 140 may identify the calling party of the call 101 intercepted at step 210.

In an aspect, the remote authentication service 150 may act as the identified caller.

At block 250, the authentication module 140 may request the caller identified at step 240 to authenticate the call 101 intercepted at step 210.

In an aspect, the authentication request for the intercepted call 101 may include but is not limited to the following information: the called party; the calling party (caller); parameters of the intercepted call.

In an aspect, the authentication may succeed if the caller acknowledges that the call data received in the request matches the call data stored by the caller.

At block 260, the blocking module 130 may interrupt the call 101 intercepted at block 210 in case of unsuccessful authentication performed at block 250.

In an aspect, the blocking module 130 may unblock (release) the intercepted call 101, allowing the user of the mobile device to receive such call, in response to successful authentication performed at block 250.

Figure 3:
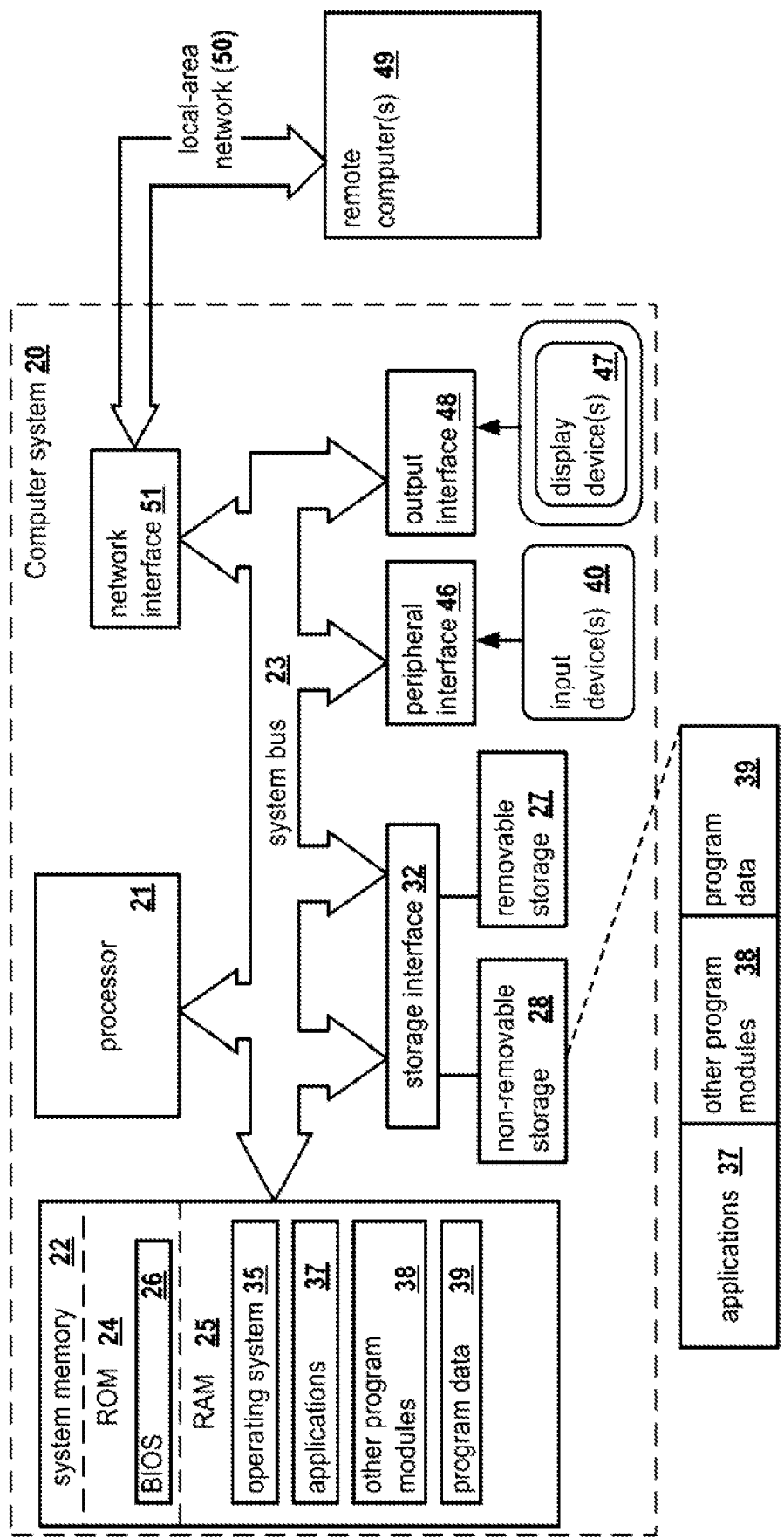
FIG. 3 shows an example of a computer system on which the variant aspects of systems and methods disclosed herein may be implemented.

FIG. 3 shows an example of a computer system on which variant aspects of systems and methods disclosed herein may be implemented. The computer system 20 may represent the system configured to implement a method for interrupting an incoming call on a mobile device.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The invention claimed is:

1. A method of interrupting an incoming call on a mobile device comprising:
    adding a plurality of phone numbers associated with a calling party to a list of prohibited phone numbers;
    intercepting an incoming telephone call received by a mobile device;
    determining one or more parameters of the intercepted telephone call;
    determining if the intercepted telephone call matches one or more telephone calls associated with the list of prohibited phone numbers by comparing the determined parameters of the intercepted call with parameters of the one or more telephone calls associated with the list of prohibited phone numbers;
    blocking reception of the intercepted telephone call by the mobile device in response to determining a match between the intercepted telephone call and the one or more telephone calls associated with the list of prohibited phone numbers;
    sending an authentication request to a remote authentication service that contains information about intended telephone calls provided by the calling party before the call for authentication of the intercepted telephone call; and
    interrupting the intercepted telephone call in response to unsuccessful authentication when the intercepted telephone call is not an intended telephone call; or
    unblocking the intercepted telephone call in response to successful authentication when the intercepted telephone call is an intended telephone call.

2. The method of claim 1, wherein the one or more parameters of the intercepted call are determined based on data transmitted by a mobile operator to a called party for making a connection between the calling party and the called party.

3. The method of claim 1, wherein the one or more parameters of the intercepted call comprise one or more of: a telephone number of the calling party, a name of the calling party, a location of the calling party, time of interception of the incoming telephone call.

4. The method of claim 1, wherein the authentication request to the remote authentication server includes at least the following information: called party; calling party; one or more parameters of the intercepted call.

5. The method of claim 1, wherein the authentication is successful if the remote authentication service acknowledges that the information received in the authentication request matches information provided by the calling party.

6. The method of claim 1 further comprising: receiving from a calling party a plurality of phone numbers associated with the calling party to be added to the list of prohibited numbers.

7. A system for detecting an anomaly in the behavior of a trusted process comprising:
    a memory and a hardware processor configured to:
        add a plurality of phone numbers associated with a calling party to a list of prohibited phone numbers;

intercept an incoming telephone call received by a mobile device;

determine one or more parameters of the intercepted telephone call;

determine if the intercepted telephone call matches one or more telephone calls associated with the list of prohibited phone numbers by comparing the determined parameters of the intercepted call with parameters of the one or more telephone calls associated with the list of prohibited phone numbers; and block reception of the intercepted telephone call by the mobile device in response to determining a match between the intercepted telephone call and the one or more telephone calls associated with the list of prohibited phone numbers;

send an authentication request to a remote authentication service that contains information about intended telephone calls provided by the calling party before the call for authentication of the intercepted telephone call; and interrupt the intercepted telephone call in response to unsuccessful authentication when the intercepted telephone call is not an intended telephone call; or unblock the intercepted telephone call in response to successful authentication when the intercepted telephone call is an intended telephone call.

8. The system of claim 7, wherein the one or more parameters of the intercepted call are determined based on data transmitted by a mobile operator to a called party for making a connection between the calling party and the called party.

9. The system of claim 7, wherein the one or more parameters of the intercepted call comprise one or more of: a telephone number of the calling party, a name of the calling party, a location of the calling party, time of interception of the incoming telephone call.

10. The system of claim 7, wherein the authentication request to the remote authentication server includes at least the following information: called party; calling party; one or more parameters of the intercepted call.

11. The system of claim 7, wherein the authentication is successful if the remote authentication service acknowledges that the information received in the authentication request matches information provided by the calling party.

12. The system of claim 7, wherein the hardware processor further configured to receive from a calling party a plurality of phone numbers associated with the calling party to be added to the list of prohibited numbers.

13. A non-transitory computer readable medium storing thereon computer executable instructions for detecting an anomaly in the behavior of a trusted process, including instructions for:

adding a plurality of phone numbers associated with a calling party to a list of prohibited phone numbers;

intercepting an incoming telephone call received by a mobile device;

determining one or more parameters of the intercepted telephone call;

determining if the intercepted telephone call matches one or more telephone calls associated with the list of prohibited phone numbers by comparing the determined parameters of the intercepted call with parameters of the one or more telephone calls associated with the list of prohibited phone numbers;

blocking reception of the intercepted telephone call by the mobile device in response to determining a match between the intercepted telephone call and the one or more telephone calls associated with the list of prohibited phone numbers;

sending an authentication request to a remote authentication service that contains information about intended telephone calls provided by the calling party before the call for authentication of the intercepted telephone call; and interrupting the intercepted telephone call in response to unsuccessful authentication when the intercepted telephone call is not an intended telephone call; or unblocking the intercepted telephone call in response to successful authentication when the intercepted telephone call is an intended telephone call.

14. The medium of claim 13, wherein the one or more parameters of the intercepted call are determined based on data transmitted by a mobile operator to a called party for making a connection between the calling party and the called party.

15. The medium of claim 13, wherein the one or more parameters of the intercepted call comprise one or more of: a telephone number of the calling party, a name of the calling party, a location of the calling party, time of interception of the incoming telephone call.

16. The medium of claim 13, wherein the authentication request to the remote authentication server includes at least the following information: called party; calling party; one or more parameters of the intercepted call.

17. The medium of claim 13, wherein the authentication is successful if the remote authentication service acknowledges that the information received in the authentication request matches information provided by the calling party.

18. The medium of claim 13, wherein the non-transitory computer readable medium further including instructions for receiving from a calling party a plurality of phone numbers associated with the calling party to be added to the list of prohibited numbers.

* * * * *